(12) United States Patent
Agrawal et al.

(10) Patent No.: US 8,897,798 B2
(45) Date of Patent: Nov. 25, 2014

(54) METHODS AND APPARATUS FOR RADIO RESOURCE ALLOCATION

(75) Inventors: Rajeev Agrawal, Glenview, IL (US); Naveen Arulselvan, Bangalore (IN); Suresh Kalyanasundaram, Bangalore (IN); Rangsan Leelahakriengkrai, Streamwood, IL (US); Balamurali Natarajan, Bangalore (IN); Hua Xu, Hawthorn Woods, IL (US)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 13/327,914

(22) Filed: Dec. 16, 2011

(65) Prior Publication Data

US 2013/0072213 A1    Mar. 21, 2013

(30) Foreign Application Priority Data

Sep. 16, 2011    (IN) .......................... 2687/DEL/2011

(51) Int. Cl.
*H04W 72/00*    (2009.01)
*H04W 72/12*    (2009.01)

(52) U.S. Cl.
CPC ................................ *H04W 72/1231* (2013.01)
USPC ..................... 455/452.1; 455/450; 455/452.2; 455/453; 370/329; 370/252

(58) Field of Classification Search
USPC ........................... 455/452.1–452.2, 453, 442; 370/328–330, 252
See application file for complete search history.

(56) References Cited

U.S. PATENT DOCUMENTS

| 2002/0147022 | A1* | 10/2002 | Subramanian et al. | ........ 455/453 |
| 2005/0078759 | A1* | 4/2005 | Zhang | ............................ 375/260 |
| 2005/0254457 | A1* | 11/2005 | Jung et al. | ..................... 370/328 |
| 2007/0015469 | A1* | 1/2007 | Cho et al. | ......................... 455/69 |
| 2007/0042784 | A1* | 2/2007 | Anderson | ..................... 455/450 |
| 2007/0058583 | A1* | 3/2007 | Cho et al. | ..................... 370/329 |
| 2007/0104164 | A1* | 5/2007 | Laroia et al. | .................. 370/338 |
| 2007/0140168 | A1* | 6/2007 | Laroia et al. | .................. 370/330 |

(Continued)

FOREIGN PATENT DOCUMENTS

| EP | 1610573 A1 | 12/2005 |
| WO | WO-03/032586 A1 | 4/2003 |
| WO | WO-2008/125101 A1 | 10/2008 |

OTHER PUBLICATIONS

3GPP TSG RAN WG1 Meeting #62bis, R1-105223; "Design of PDSCH muting for CSI-RS in LTE-Advanced"; Oct. 11, 2010; pp. 1-2; Xi'an, China.

*Primary Examiner* — Nathan Taylor
(74) *Attorney, Agent, or Firm* — Harrington & Smith

(57) ABSTRACT

Systems and techniques for scheduling of use of resources by wireless devices and allocation of resources among devices. Information is received relating to channel efficiency experienced by a user equipment and also to the channel efficiency experienced by other user equipments. The information may include channel gain. Scheduling and resource allocation are performed so as to provide service to each device while minimizing interference penalties imposed by devices on one another. Scheduling and resource allocation may be evaluated and conducted through a number of mechanisms, such as ranking users according to transmit power, ranking user equipments according to target signal to noise ratios, and evaluation of relative advantages to users with the evaluation being performed resource block by resource block. The various metrics take into account both advantages to a particular user equipment under consideration and detrimental effects on other user equipment.

14 Claims, 8 Drawing Sheets

(56) References Cited

U.S. PATENT DOCUMENTS

| | | | |
|---|---|---|---|
| 2007/0243874 A1* | 10/2007 | Park et al. | 455/442 |
| 2009/0258654 A1* | 10/2009 | Hagerman | 455/452.1 |
| 2010/0220683 A1* | 9/2010 | Novak et al. | 370/330 |
| 2010/0296405 A1* | 11/2010 | Madan et al. | 370/252 |
| 2010/0317385 A1* | 12/2010 | Kazmi et al. | 455/501 |
| 2011/0003598 A1 | 1/2011 | Ma et al. | 455/452.1 |
| 2011/0199933 A1* | 8/2011 | Liu et al. | 370/252 |
| 2011/0228712 A1* | 9/2011 | Anderson | 370/280 |

* cited by examiner

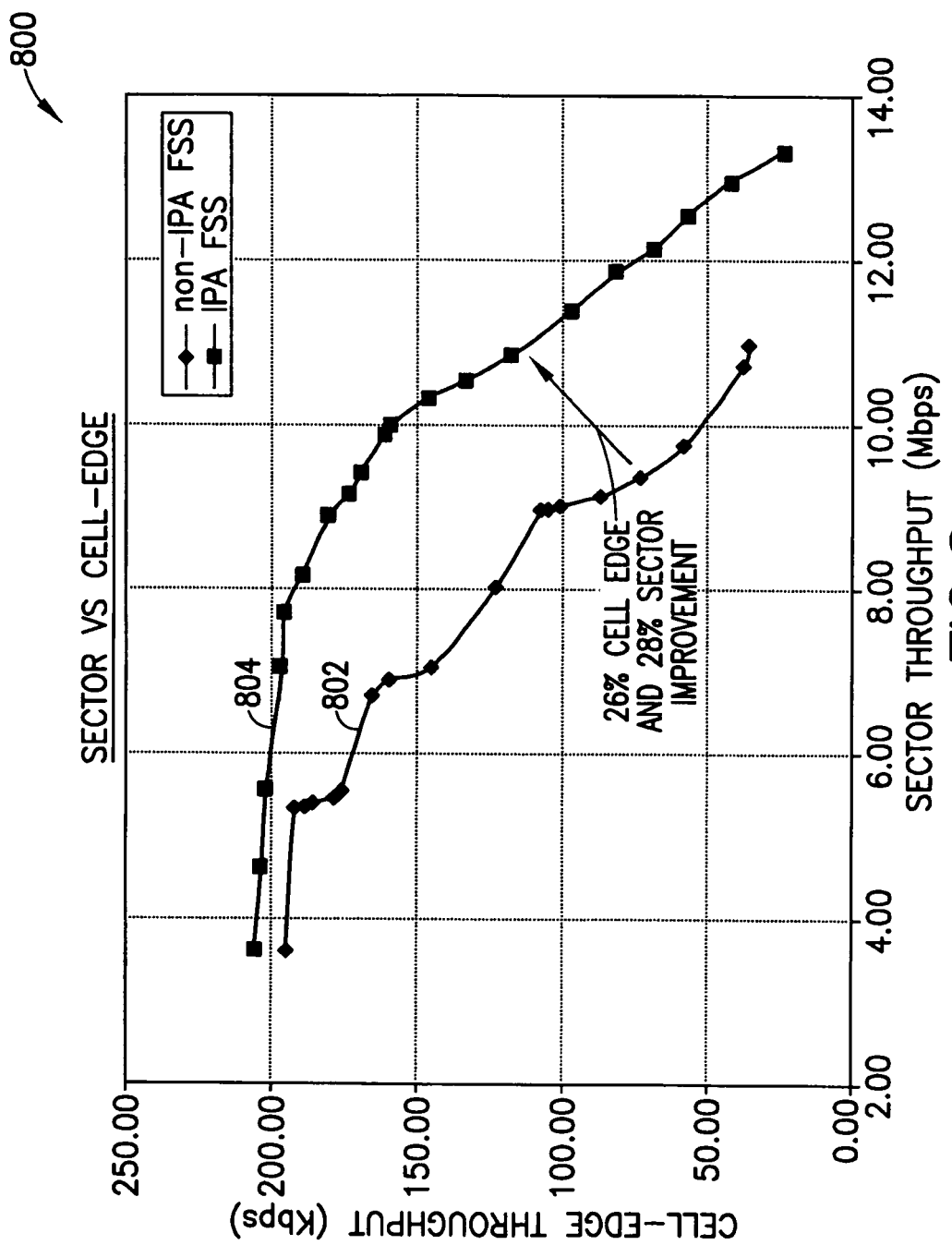

METHODS AND APPARATUS FOR RADIO RESOURCE ALLOCATION

PRIORITY

This application claims priority under 35 U.S.C. 119(a) to "Methods and Apparatus for Radio Resource Allocation," Indian Patent Application No. 2687/DEL/2011, filed on 16 Sep. 2011 and incorporated herein by reference in its entirety.

FIELD OF THE INVENTION

The present invention relates generally to wireless communication. More particularly, the invention relates to systems and techniques for managing allocation of resources to devices operating in a wireless network.

BACKGROUND

One of the greatest problems facing wireless network operators is the need to serve large numbers of customers with varying needs using the infrastructure available to them. Numerous considerations affect the number of customers that may be served by a particular set of resources, and constant efforts are being directed toward scheduling of devices and allocation of resources to devices to achieve high levels of overall efficiency.

SUMMARY OF THE INVENTION

In one embodiment of the invention, a method comprises receiving channel gain information from a user equipment. The channel gain information comprises measurements of the channel gain experienced by the user equipment to its serving and neighboring cell base stations. One or more parameters are computed for scheduling and resource allocation among the user equipment and the additional user equipments. The one or more parameters are calculated so as to take into account the measurements of channel gain experienced by the user equipment to its serving and neighboring cell base stations.

In another embodiment of the invention, a computer readable memory stores a program of instructions. When executed by a processor, the instructions cause an apparatus to perform functions comprising receiving channel gain information from a user equipment. The channel gain information comprises measurements of channel gain experienced by the user equipment to its serving and neighboring cell base stations. The functions further comprise computing one or more parameters for scheduling and resource allocation among the user equipment and the additional user equipments. The one or more metrics are calculated so as to take into account the measurements of channel gain experienced by the user equipment to its serving and neighboring cell base stations.

These and other embodiments are described below with particularity.

BRIEF DESCRIPTION OF THE DRAWINGS

FIGS. 7 and 8 illustrate results of scheduling and resource allocation according to embodiments of the present invention.

DETAILED DESCRIPTION

Figure 1:
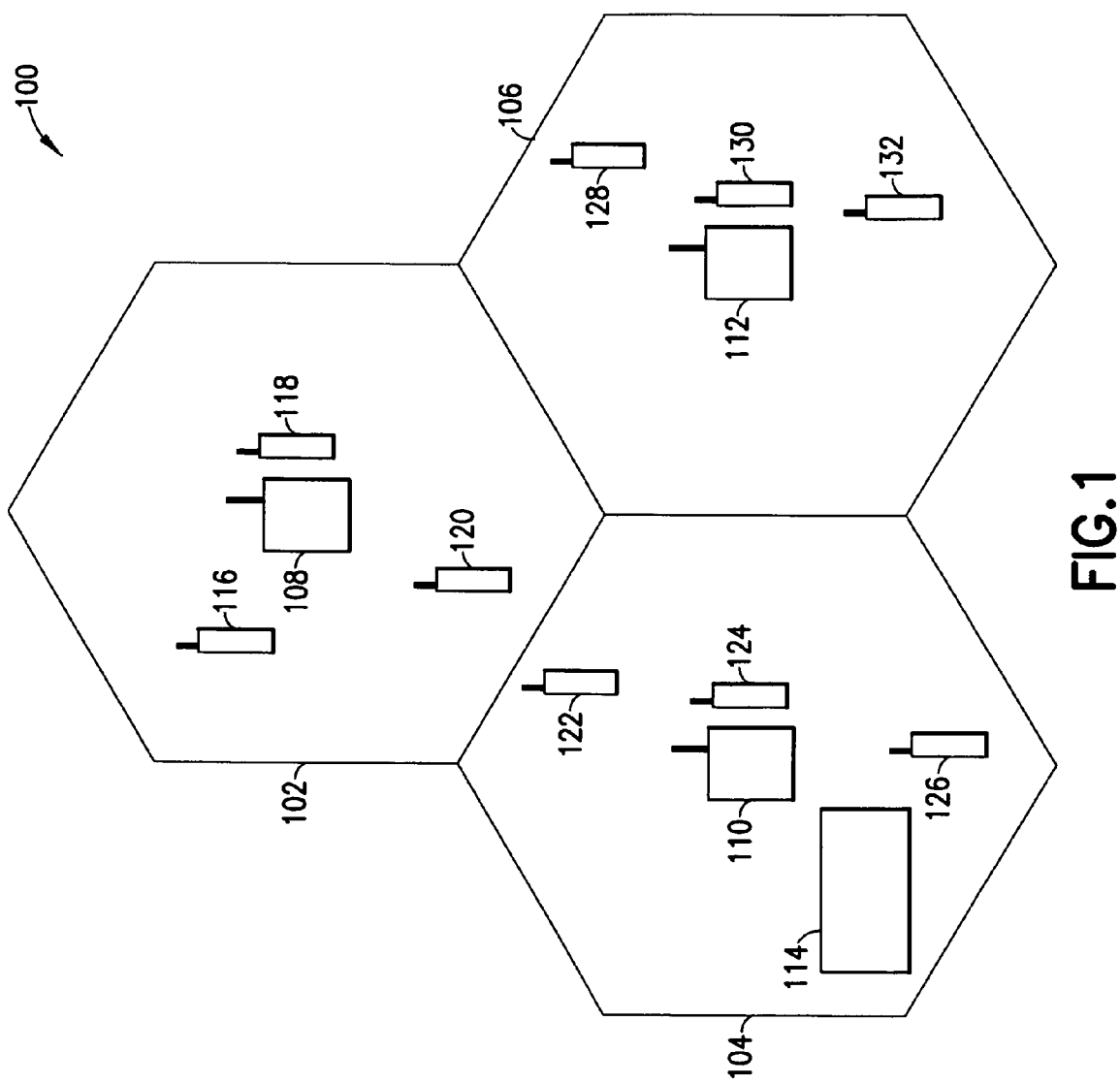
FIG. 1 illustrates a network that may be operated according to an embodiment of the present invention.

Various embodiments of the present invention recognize that the quality of service provided to users is affected not only by their own interactions with network resources, but by the operations of other users and the allocation of resources to those users. It will also be recognized that allocations of the same resources to different users may provide different levels of improvement from one user as compared to another, and that the overall service provided to all users is an important consideration in resource allocation, so that an advantageous overall level of service to the entire user population can be better provided by taking into account, for the allocation to resources of each user, how such an allocation will affect other users, and by comparing the improvement provided to one user by particular resources to the improvement that might be provided to other users if they were allocated the same resources.

An important measure of service to a user is the throughput that can be achieved by a user, and an important factor in determining the throughput achieved by a user is the channel gain experienced by the user. The overall service provided by a network, therefore, is in substantial part a factor of total throughput achieved by all users and this total throughput is influenced by the channel gain experienced by all users. Therefore, embodiments of the present invention evaluate the allocation of resources to one user by taking into account not only the positive effect of the allocation on the user's channel gain, but also the negative effect of the allocation on the channel gains of other users. If the channel gain to the user's own receiver is referred to as g, the channel gain to another user's receiver may be referred to as g'. Information indicating the channel gain of another receiver may be obtained using reciprocity. The transmitting device of a transmitter-receiver pair engaging in communication measures the received signal strength from other receivers acting as transmitters. An example of this procedure would be, during the uplink of a cellular system, a measuring by a mobile device of the received signal strength from base stations in the downlink. In a frequency division duplex (FDD) system, this reciprocity allows measurement of long-term average channel gain that corresponds to distance and shadow fade based channel gain, while for a time division duplex (TDD) system, reciprocity allows measurement of the long and short term channel gain that also includes distance-based channel gain and shadow fade-based channel gain.

In various embodiments of the invention, various exemplary factors may be taken into account in making scheduling and resource allocation decisions. One such factor is the relative ranking of users based on one or more user metrics. Examples of such metrics and their computation are discussed in additional detail below. Another factor is power allocation. As part of determining power allocation, power per channel resource may be calculated. For example, power per resource block in a long-term evolution or long-term evolution advanced (LTE or LTE-A) system may employ as a factor to be taken into account the received signal to noise ratio per channel resource. In addition to taking into account the channel gain to other receivers, an analysis of the most advantageous resource allocation may take into account an interference penalty or "price" to another receiver.

A number of scheduling and resource allocation decisions may be made. Among these decisions are the determination or computation of a user metric and ranking of users for selection according to this metric. Another decision may involve power allocation, and decisions related to power allocation may include channel resource allocation and assignment, such as resource block allocation and assignment in an LTE or LTE-A system, and a target received signal to noise ratio per channel resource.

Channel resource allocation and assignment decisions may also be made. Channel resource allocation refers to the number of shared channel resources and deciding channel resource allocation may involve determining a user metric or ranking. Channel resource assignment refers to assigning specific channel resources in one or more of frequency, time, code, and space in cases such channel resources are known to have different channel gains, such as by using a sounding reference symbol (SRS) in an LTE uplink.

In general, scheduling and resource allocations depend on the quality of service (QoS) both desired by and actually realized by users, as well as traffic characteristics such as QoS class, target delay and target throughput, as well as actual delays, throughputs, queue lengths, and channel gains. Possibly, channel gains may be time, frequency, or space dependent.

Allocation of a shared channel resource to one device, and use of the shared channel resource by the device, imposes a greater or lesser penalty on other devices. This penalty may suitably be referred to as an interference penalty. Various embodiments of the present invention take the interference penalty to other users into account in allocating resources, and some embodiments use information relating to the channel gains g' of other users' receivers in determining appropriate resource allocations and making such allocations. Various specific mechanisms for taking such information into account are described in greater detail below.

FIG. 1 illustrates a wireless network 100, comprising cells 102, 104, and 106, served by base stations 108, 110, and 112, respectively. A network controller 114 may manage the operations of, and provide services for, the base stations 108, 110, and 112, and a number of user devices, which may also be referred to as user equipments or UEs, are present in the cells 102, 104, and 106. The UEs illustrated here are UEs 116-132, and it will be recognized that the particular number and distribution of UEs illustrated here is exemplary, and that many cells can be expected to serve large numbers of UEs. It will be further recognized, however, that many cells may be relatively small, such as cells that are known as micro-cells, pico-cells, or femto-cells, and that these cells may serve only a limited number of users over a relatively small area. The teachings of the present invention may be advantageously employed in cells of any size, with particular advantages being gained for cells in which users are particularly susceptible to interference.

Figure 2A:
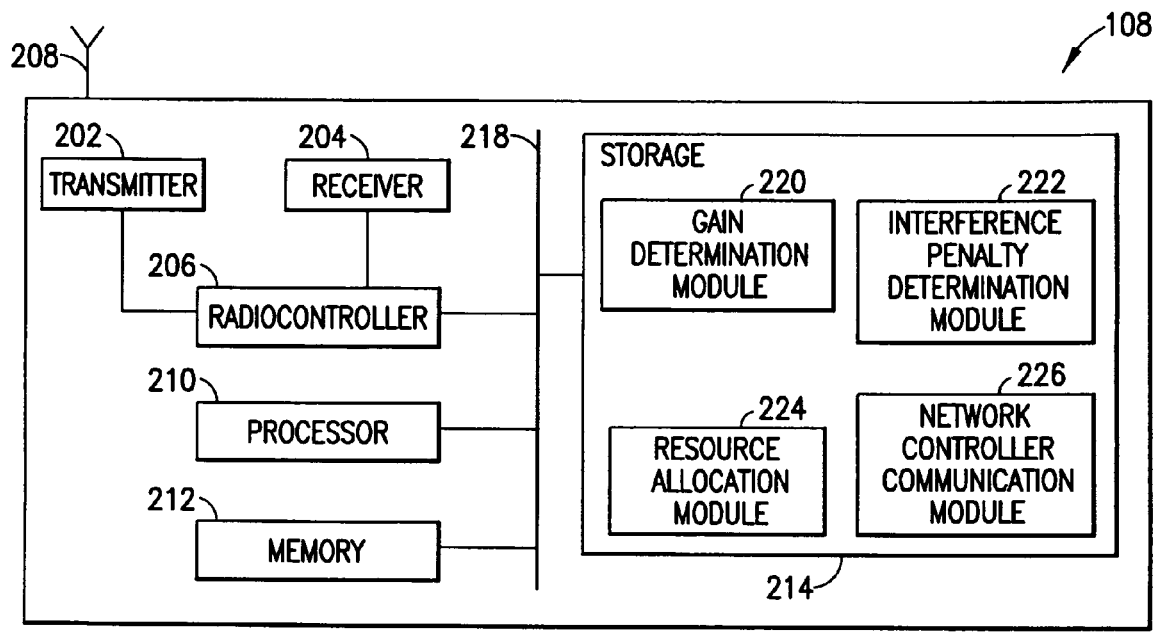
FIG. 2 illustrates devices that may operate according to an embodiment of the present invention.
Figure 2B:
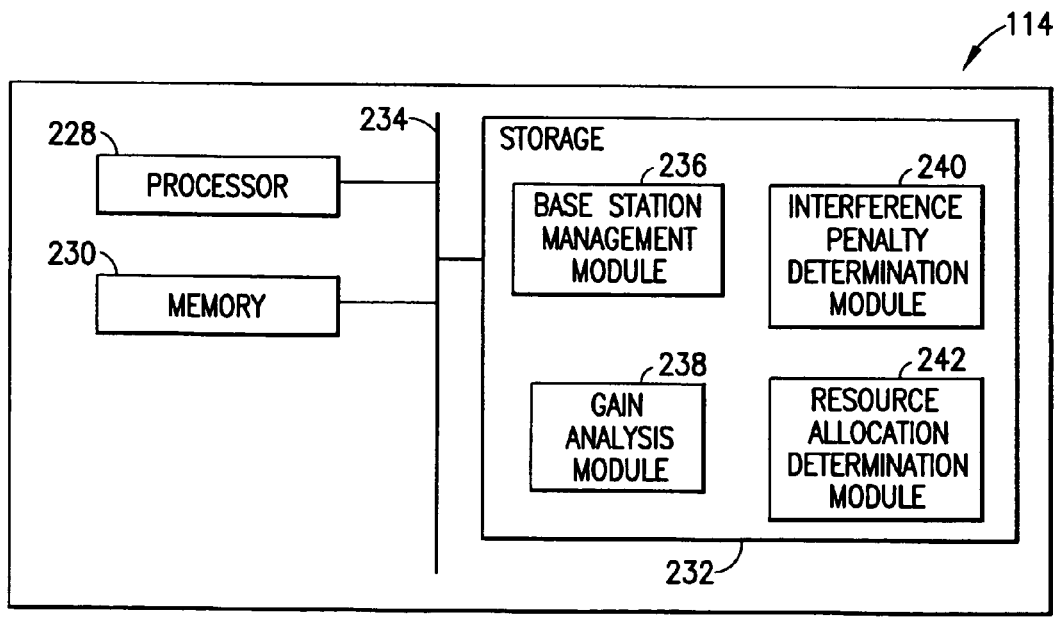
Figure 2C:
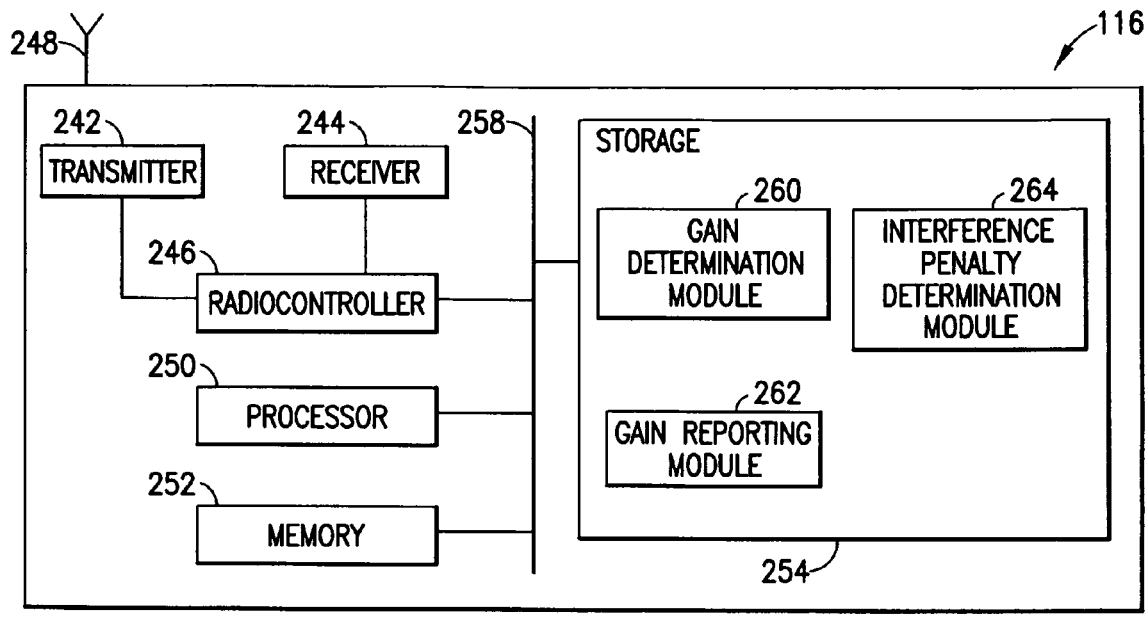

FIGS. 2A-2C illustrate additional details of the exemplary base station 108, network controller 114, and UE 116, respectively. It will be recognized that the particular configurations shown here are exemplary only, and that significant variations between devices may exist that may employ embodiments of the present invention. FIG. 2A illustrates the base station 108, which may comprise a transmitter 202, receiver 204, radiocontroller 206, and antenna 208. The base station 108 may also comprise a processor 210, memory 212, and storage 214, communicating with one another and with the radiocontroller 206 over a bus 218. The base station 108 may comprise various elements directed toward determining the effects of resource allocations on the quality of service experienced by its served UEs, with one aspect of such quality of service being the channel gain experienced by UEs. The base station 108 may also comprise elements directed toward allocating resources to UEs based on quality of service considerations. Elements may, for example, comprise a gain determination module 220, an interference penalty determination module 222, a resource allocation module 224, and a network controller communication module 226. The gain determination module 220, the interference penalty determination module 222 resource allocation module 224, and the network controller communication module 226 may be implemented as software, residing in storage 214 and transferred to memory 212 as needed for execution by the processor 210.

FIG. 2B illustrates the network controller 114, which may suitably communicate with the base stations 108, 110, and 112 using mechanisms known in the art, and may employ a processor 228, memory 230, and storage 232, communicating over a bus 234. The network controller 114 may also employ a base station management module 236, a gain analysis module 238, for analyzing gain information reported by the base stations 108-112, an interference penalty determination module 240, and a resource allocation determination module 242.

FIG. 2C illustrates the UE 116, which may comprise a transmitter 242, receiver 244, radiocontroller 246, and antenna 248. The UE 116 may also comprise a processor 250, memory 252, and storage 254, communicating with one another and with the radiocontroller 256 over a bus 258. The UE 116 may further comprise a gain determination module 260, a gain reporting module 262, and an interference penalty determination module 264.

The network controller 114 may suitably receive gain information from the base stations 108-112 and compute interference penalty information and perform resource allocation for the network 100 as a whole, or each of the base stations 108-112 may receive or compute gain information for its users and compute interference penalty information and perform resource allocation for its users. A UE such as the UE 116 may receive or compute gain information relating to its own activities and compute the interference penalty imposed on other users by its activities, and may furnish this information to its serving base station.

The following computations may be carried out by any network device allocating resources or determining which resources should be allocated, or by any device that is performing computations for use by another device allocating resources or making resource allocation determinations. Embodiments of the present invention take approaches that involve determining the interference penalty imposed by scheduling and resource allocation decisions, with the value of g' being taken into account in determining the interference penalty. An exemplary set of computations, carried out to determine uplink scheduling for an LTE cellular system, is presented below. The following computations may be carried out by any network device allocating resources or determining which resources should be allocated, or by any device that is performing computations for use by another device allocating resources or making resource allocation determinations. For convenience, the computations below may be thought of as being carried out over the network 100 as a whole by the network controller 114.

For a user i, which may be one of the UEs 116-132, a target received signal to noise ratio (SINR) $nu_i$ may be computed as follows:

$$nu_i \approx v_i^\gamma \frac{P_0}{I+N_T} \max\left\{\left(\frac{g_i}{g_i'}\right)^\alpha, S_i\right\}$$

where $\gamma$ and $\alpha$ are adjustment parameters, $P_0$ is a power parameter, and $S_i$ is a lower bound on $$\frac{g_i}{g_i'}.$$

I is interference seen at the base station of the cell, and $N_T$ is thermal noise seen at the base station of the cell. $v_i$ is a function given by $v_i = v_i(x_i, d_i, q_i)$, where, for the user (and bearer), $x_i$=throughput, $d_i$=delay, and $q_i$=queue length. A special case of this function can be seen in the case in which the throughput dependence is given by:

$$v_i = \begin{cases} x_i^{-\beta}, & x_i < C \\ hC^{-\beta}, & x_i \geq C \end{cases}$$

where C is a target throughput for the user and bearer, and may be determined by any one or more of a number of factors. One exemplary factor is a subscription class to which the user belongs, such as diamond, gold, and silver, with a user in a higher class being entitled to a higher throughput. The values $\beta$ and h are fixed parameters, subject to the constraints that $\beta \geq 0$ and $h \leq 1$. If the value of C is set to infinity, the special case presented above yields the typical term for the proportional fair metric.

The target received SINR, that is, $nu_i$, may be used in computing an appropriate metric that may be employed to rank users. According to one embodiment of the present invention, the transmit power is used as a criterion for ranking of users, and is calculated as follows:

$$p_i = \min\left\{P_{max}, \frac{n_i(I+N_T)}{bg_i} nu_i\right\}$$

The various users i=1, 2, 3, ..., n, may simply be ranked according to their transmit power $p_i$ for each user i, calculated using the above expression, which takes into account the channel gains g' to other users' receivers due to the use of the value $nu_i$. The value b is a correction factor of the user's channel, which may be an SINR correction factor or a static system factor, and $n_i$ is the number of resource blocks allocated to user i.

An approach used in another embodiment of the invention is to compute a specific user metric as follows:

$$m_i = v_i\left[\ln(1 + \min\{\sigma_i, nu_i\}) - \frac{\min\{\sigma_i, nu_i\}}{nu_i + 1}\right]$$

and to rank the users i=1, 2, 3, ..., n according to the computed value of $m_i$ for each user i, with the value of $m_i$ also taking interference into account due to the use of the value $nu_i$ in the expression above. In the above expression, the value $\sigma$ is an upper bound on SINR beyond which an increase in SINR provides no additional benefit.

An approach according to another embodiment of the invention is to determine the allocation of channel resource blocks to users based not only on the advantages to the user under consideration for allocation of the resource blocks, but on the potential advantage to other users of being allocated the resource blocks for themselves. The number of channel resource blocks allocated to a user i is given by $N_i^*$ where $N_i^*$ is selected from ($N_{REQ}$, $N_Q$, $N_{MCS}$, $N_{TBS}$), where REQ stands for "required," Q stands for the drainout queue, MCS stands for "modulation and coding scheme" and TBS stands for "transport block size".

If desired, resource blocks may first be allocated based on quality of service classes to which users belong, with users who are entitled to guaranteed bit rates being allocated sufficient resource blocks to fulfill the guarantee and with other users being allocated the remaining resource blocks according to criteria discussed below. Users may be entitled to guaranteed bit rates based, for example, on the activities in which they are engaged or on their subscription classes, for example. A user using voice over IP (VOIP) services may be entitled to a guaranteed bit rate based on the need for such a bit rate in order to receive acceptable service. Another user might belong to a premium subscription class and might be entitled to a guaranteed bit rate because of the subscription class.

In one approach, the objective for users that are not provided with guaranteed bit rates is to maximize the total bit rate for all such users, subject to a constraint that all users be provided the target throughput C, to the extent to which this is achievable. Users may be divided into categories based on efficiency. Category 1 may include low efficiency users, such as cell edge users, who are unable to achieve C regardless of the SINR they are provided. Category 3 users are users that are able to achieve C, but only with some boost to their weights v, and category 2 users are high efficiency users who can receive significant benefits from increased target SINR.

Figure 3A:
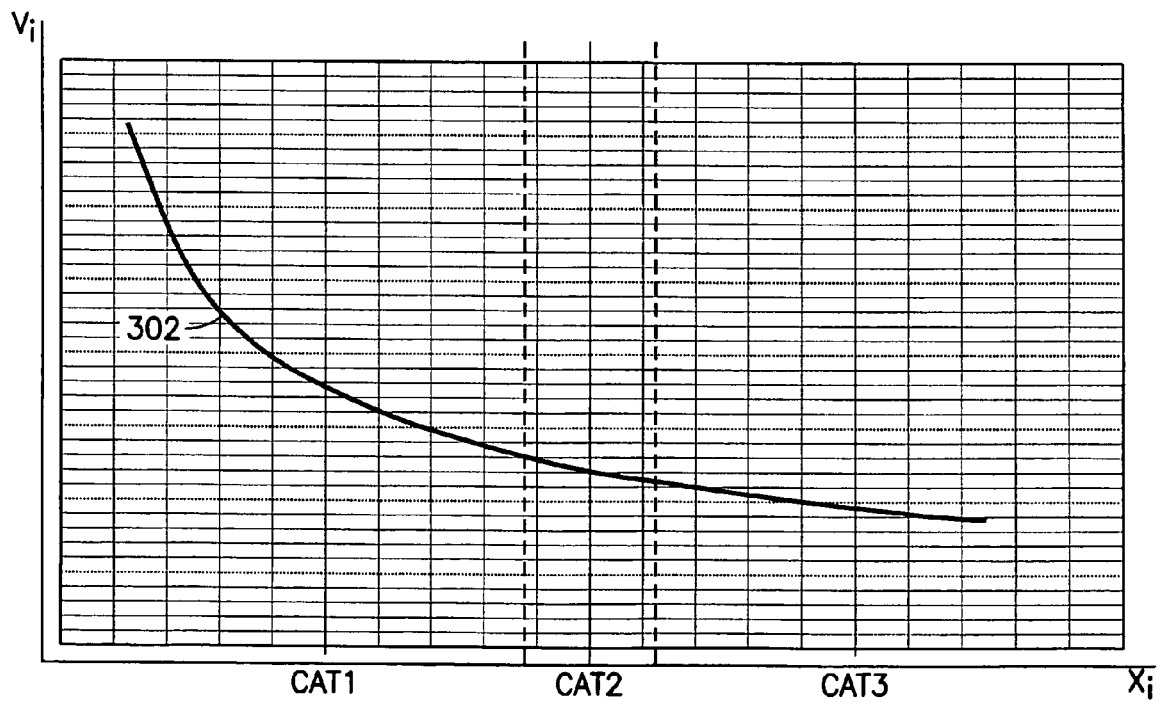
FIGS. 3A-3C compares target signal to noise ratio against throughput for various exemplary scheduling and resource allocation mechanisms.
Figure 3B:
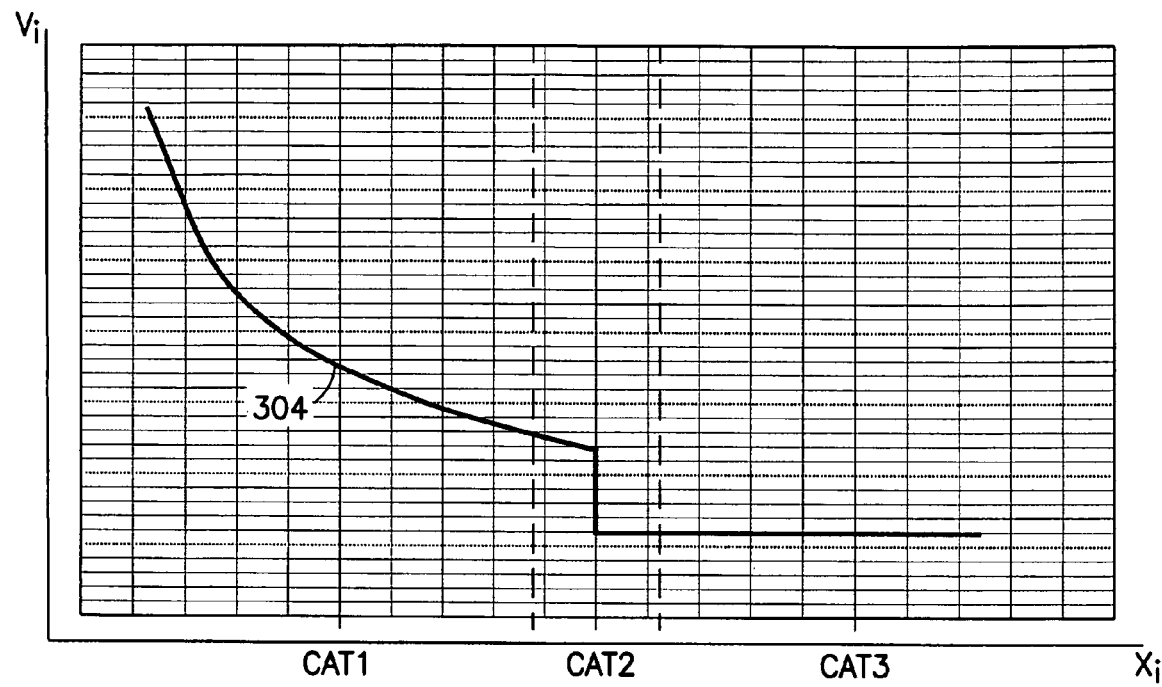
Figure 3C:
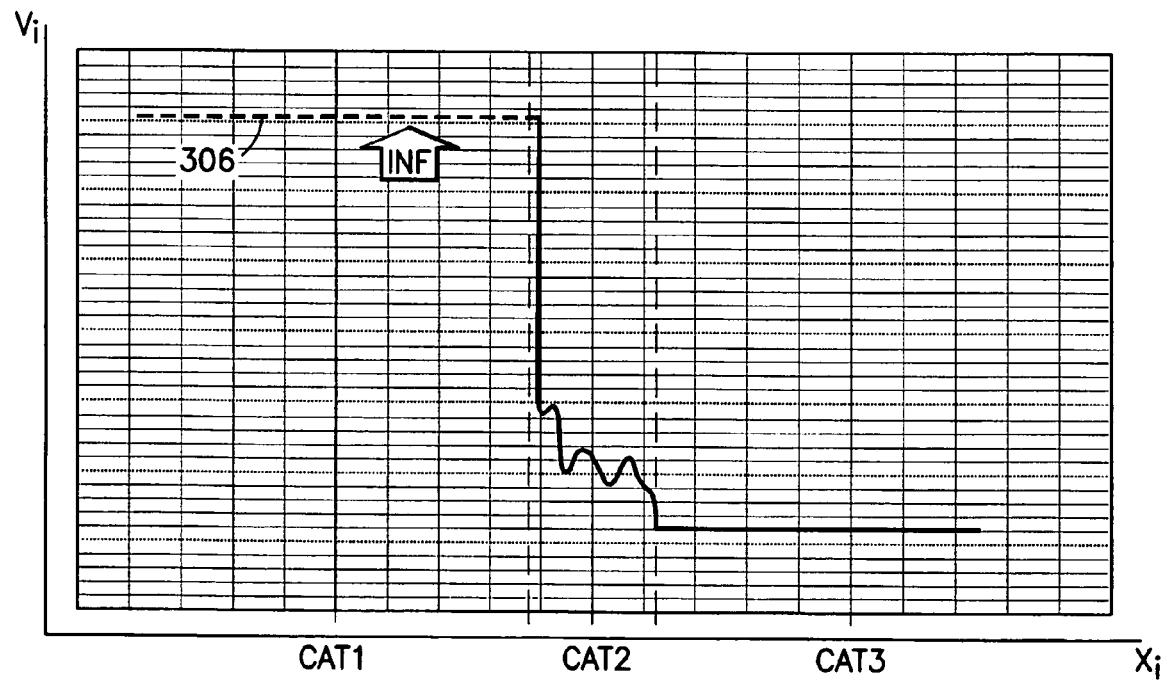

FIGS. 3A-3C illustrate graphs 302, 304, and 306, respectively, plotting weights v against throughput for category 1, category 2, and category 3 devices. The graph 302 of FIG. 3A illustrates proportional fair scheduling, the graph 304 of FIG. 3B illustrates an embodiment of the invention employing the metric $m_i$ calculated as presented above, and the graph 306 of FIG. 3C illustrates an approach according to an embodiment of the present invention, wherein channel resource allocation is performed as described in greater detail below. In FIG. 3C, it can be seen that category 1 users cannot achieve the target throughput C. This condition is represented by the condition of infinite weight v to achieve the rate constraint. For category 3 users, the weights v can be shown to vary due to the making of adjustments to achieve the rate constraint, and for category 2 users it can be seen that a high rate is achieved with a low weights v requirement.

In order to achieve the desired objective, namely, the achievement (for non guaranteed bit rate users) total throughput over all users while meeting (for non category 1 users) the minimum rate constraint C, embodiments of the present invention perform specific allocation of channel resource blocks to users in a way that balances the benefits to the individual user against the overall benefits to users throughout the system. The resource block allocation to a user is given by the value N*, where N the number of resource blocks and N* is the target number of resource blocks. In the present exemplary embodiment, the target value N* is taken from one of $N_{TBS}$ where TBS is the transport block size, $N_{MCS}$ where MCS is the modulation and coding scheme, $N_{REQ}$ where REQ is "required," and $N_Q$. In order to target a throughput of C, a value for $TBS_{REQ}$ is computed as provided by $\Delta(t+1)$ below, where $\Delta(t+1)$ is the number of additional bits needed at time $(t+1)$ in order to achieve C.

$$x(t+1) = \lambda x(t) + (1-\lambda)\Delta(t+1)$$

$$x(t+1) = C \Rightarrow \Delta(t+1) = \min\left\{\frac{C-\lambda x(t)}{(1-\lambda)}, 0\right\}$$

For each $TBS_{REQ}$, the required number of RBs, which may be referred to as $N_{REQ}$, may be given by $$TBS_{REQ} = N_{REQ}\alpha\log\left(1 + b\min\left\{\frac{gP_{max}}{N_{REQ}(I+N_T)}, nu\right\}\right),$$

where $\alpha$ is a rate adjustment coefficient.

Figure 4:
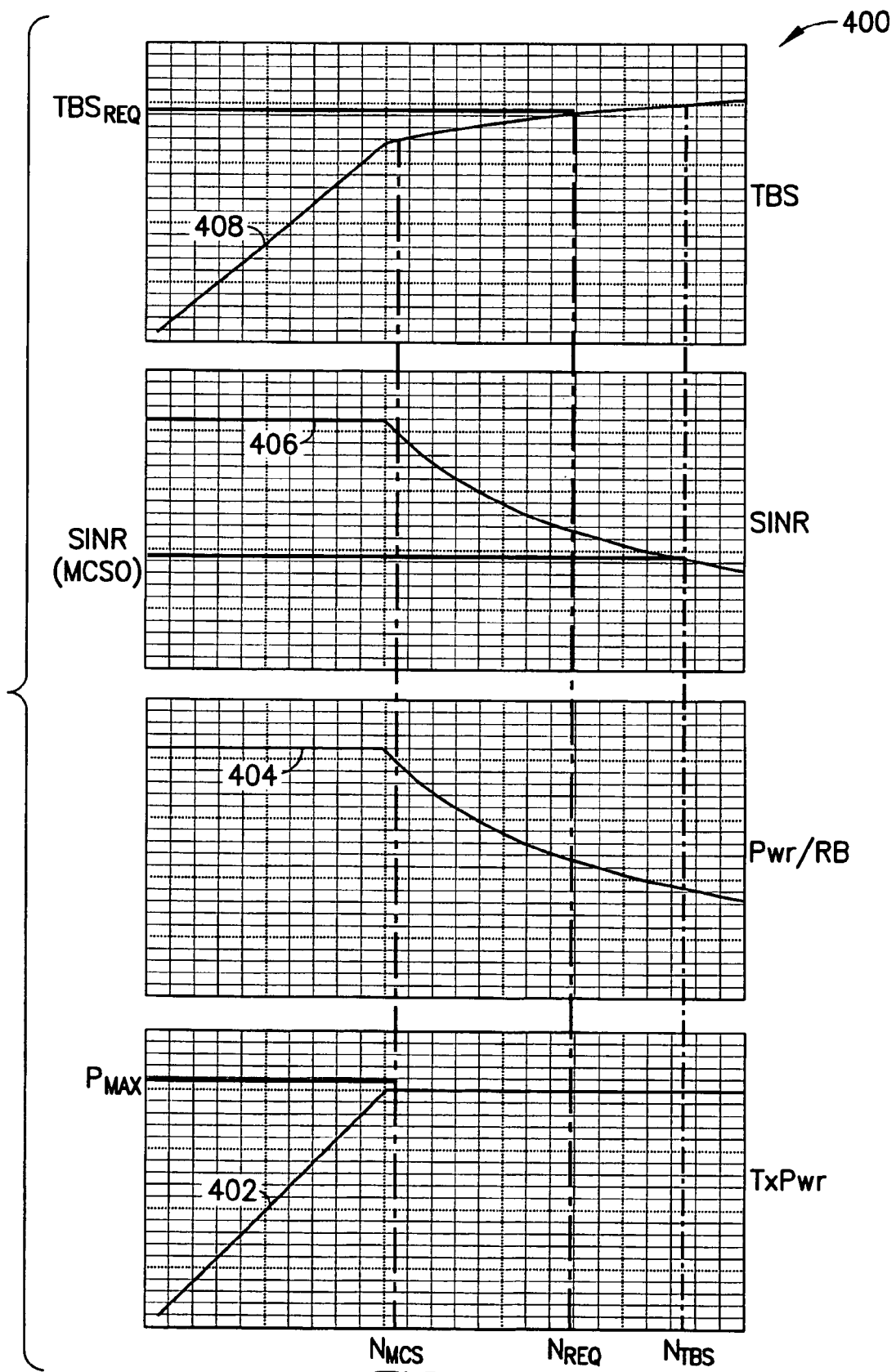
FIG. 4 illustrates the response of various properties to resource allocation.

FIG. 4 presents a graph 400 illustrating the behavior of various parameters as N* increases. The graph 400 includes curves 402, 404, 406, and 408, illustrating parameters shown are transmit power, power per resource block, target SINR, and $TBS_{REQ}$, respectively. In the present example, transmit power increases with increasing N until $P_{MAX}$ is achieved when N reaches $N_{MCS}$. Once $P_{MAX}$ is reached, transmit power stops increasing. This behavior is illustrated by the curve 402. Power per resource block, illustrated by the curve 404, remains steady as power increases, because the power increases as the number of resource blocks increases. Once $P_{MAX}$ is reached, power per resource block begins to decrease because the number of resource blocks increase without a corresponding increase in power. The required transport block size also increases as transmit power increases, and begins to approach a bound once $N_{MCS}$ is reached, as illustrated by the curve 408. In the present example, the target SINR begins to decrease as the number of resource blocks exceeds $N_{MCS}$. The curve 406 shows that the target SINR has some lower bound, and this is true because no matter how efficient communication becomes and how many resources are provided, some signal to noise ratio will still be needed.

The target resource block allocation N* is given by $\min\{N_Q, N_{REQ}, N_{TBS}\}$.

Once the target resource block number N* has been calculated for each user, it may be summed over all users and the total, $\Sigma N^*$, compared to the total resource blocks available. If the value of $\Sigma N^*$ is greater than the total resource blocks available, the value of N* should be decreased, and if the value of $\Sigma N^*$ is equal to the total resource blocks available, the value of N* is correct. If the value of $\Sigma N^*$ is less than the total resource blocks available, the value of N* may be increased and additional resource blocks may be allocated to the most efficient users. One exemplary procedure for determining this addition is as follows:

Rank order users in decreasing order of (g/g')
Beginning with the highest-ranked user, add RBs (up to a maximum of $N_{MCS}$) to each UE while RBs are available.
If RBs are still available, add RBs (up to a maximum of $N_{TBS}$) to each UE while RBs are available.

Figure 5:
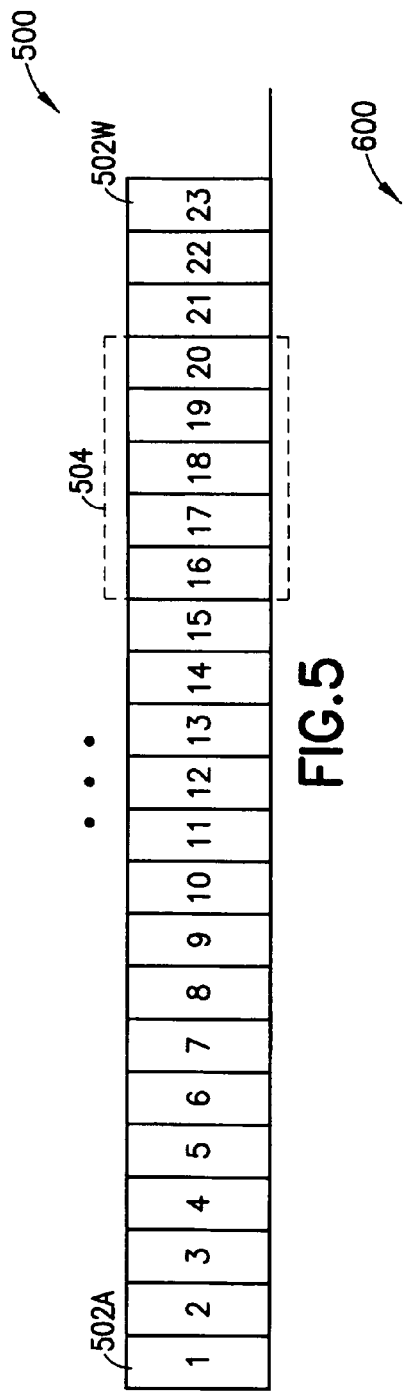
FIG. 5 illustrates an aspect of resource allocation according to an embodiment of the present invention.

In order to determine allocation to specific UEs, the following procedure may be used. It will be recognized that resource blocks represent bandwidth resources in an LTE system. That is, a number of resource blocks represent a portion of the available bandwidth. Resource blocks need to be allocated to a UE contiguously. Suppose that the resource blocks are arranged contiguously in a horizontal row 500, as illustrated in FIG. 5, with the blocks ranging from block 502A to block 502W. A window 504 is placed over the row 500 to select contiguous blocks. The window 504 is set at the size N* determined as discussed above. For the UE with the largest value of N*, set the size of the window 404 to the size N* and slide it over the row 500 to find the best location in the row based on a per resource block metric $m_{i,j}$ discussed below. Selection of the UE may be in category order, for example, a UE in category 1 may be selected for the operation, then a UE in category 2, then a UE in category 3, then returning to category 1. In the present example, the resource blocks 502A-502W have been numbered from 1 to 23 for convenience, and the metric $m_{i,j}$ is based on a per resource block calculation, taking into account the gain afforded to the UE i by allocation of the resource block j compared to the that would be provided to other users by the resource block. The gain provided to other users may be found, for example, by computing the gain for each user other than the user i and comparing the maximum gain among the users to that provided to the user i.

The window 504 is contracted or expanded left or right using the metric, with the following criteria being used to stop the expansion or contraction. For a category 1 UE, that is, a UE for which N* is $N_{TBS}$, the resource block allocation that maximizes TBS is chosen. For a category 2 UE, that is, a UE for which N* is $N_{MCS}$, the resource block allocation is chosen such that TBS is maximized subject to transmit power P being less than $P_{MAX}$. For a category 3 UE, that is, a UE for which N* is $N_{REQ}$, the allocation chosen is the smallest allocation such that TBS is equal to $TBS_{REQ}$. Power control may suitably be performed based on nu, that is, the target SINR, and the corresponding MCS.

An evaluation is performed to determine whether to allocate the resource blocks to the UE. For each resource block j, an evaluation is performed, taking into account a comparison between the gain provided to the user i by the resource block j and the average gain provided to the user i over all resource blocks, coupled with a comparison of the gain provided to other users by the resource block j and the average gain provided to other users by all resource blocks. The evaluation is performed based on the following metric:

$$m_{i,j} = \frac{\left(\frac{g_{i,j}}{g_i}\right)}{\max_{o \neq i}\left(\frac{g_{o,j}}{g_o}\right)}$$

It will be recognized that the value of $m_{i,j}$ is higher when two conditions are fulfilled—first, that the gain provided by the resource block j is higher than the average over all resource blocks, and second, that the gain provided by the resource block j to other users is lower than the average, or at least not higher than the average, over all resource blocks. The numerator of the expression for increases with the relative improvement to the user i provided by the resource block j, but this increase may be matched or overcome by an improvement to another user. Thus, the value $m_{i,j}$ will tend to favor providing an exceptionally favorable resource block to the user i, but this tendency may be lessened or overcome if the resource block is equally favorable, or more favorable, for another user.

In order to perform the various evaluations employed by embodiments of the present invention, it is advantageous to determine the relative channel gain $$\frac{g_i}{g'_i}.$$

One mechanism for determining this relative channel gain is through inverting Shannon's capacity formula:

$$\frac{g_i}{g'_i} = \frac{g^{UL}_{k_0 i}}{\sum_{k \neq k_0} g^{UL}_{ki}} \approx S_{CQI} := \frac{P_{k_0} g^{DL}_{k_0 i}}{\sum_{k \neq k_0} P_k g^{DL}_{ki} + N_T} = \frac{1}{b_{CQI}} \left( 2^{\frac{MPR(CQI)}{a_{CQI}}} - 1 \right).$$

Various values used in this expression are defined as follows:

$a_{CQI}$—rate adjustment coefficient for CQI conversion;
$b_{CQI}$—SINR adjustment coefficient for CQI conversion;
$g^{DL}_{ki}$—channel gain from the eNB k to the user i;
$P_k$—transmit power of eNB k. Because this is measured on the data channel for the neighbor cell, the transmit power can be activity dependent. Thus, the transmit power may be filtered over time and possibly over frequency.

A sounding reference signal based channel gain multiplier may also be added to the expression above. This might be a varying term $g^{fast}_i$.

In the description above, a constant value for an interference penalty or price is used, captured by the constant $\lambda = 1/P_0$ in the SINR target $nu_i$. This constant can be replaced by a dynamic quantity, with the interference penalty or price being given by the following expression:

$$\lambda_i = -\sum_k \frac{dV_k}{dp_i} = -\sum_k \frac{\partial V_k}{\partial I_k} \frac{\partial I_k}{\partial p_i} = \sum_k c_k g_{i,k} =: cg'_i$$

where
$V_k$ is the value function in neighbor cell k. $I_k$ is the total interference in neighbor cell k.

$$c_k = -\frac{\partial V_k}{\partial I_k} = \left( \sum_{j \in cell\ k} av_j n_j \frac{\frac{p_j g_j}{n_j}}{\frac{p_j g_j}{n_j} + I + N_T} \right) \frac{1}{I + N_T}.$$

Figure 6:
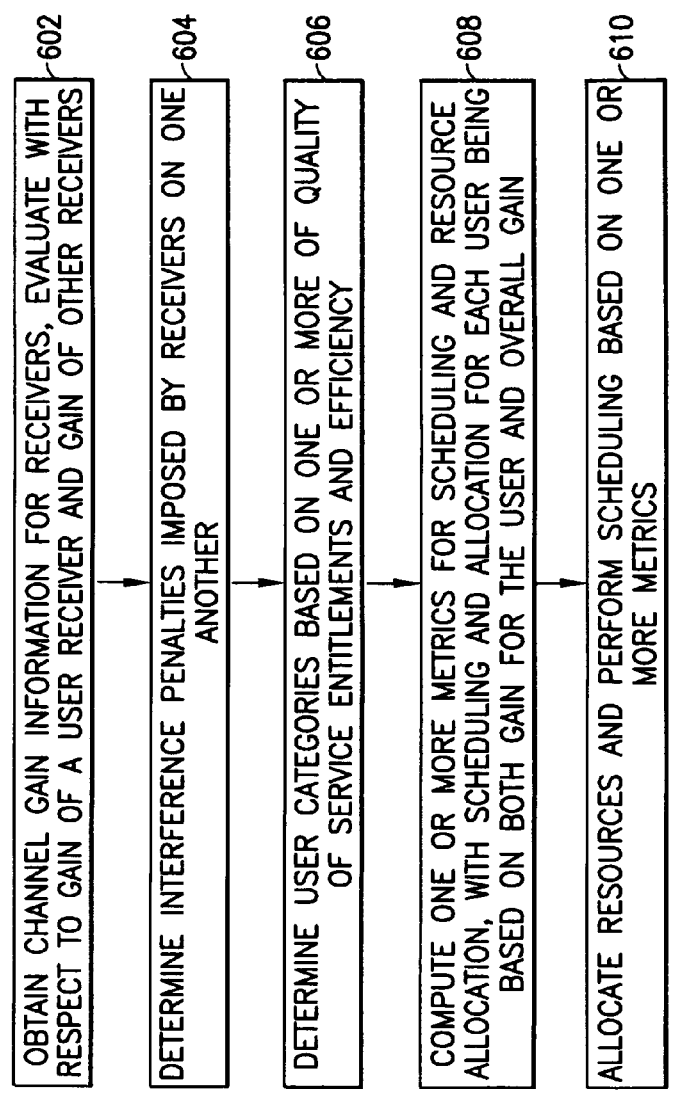
FIG. 6 illustrates a process of determining and performing scheduling and resource allocation according to an embodiment of the present invention.

FIG. 6 illustrates a process 600 of scheduling management and resource allocation according to an embodiment of the present invention. At step 602, channel gain information for receivers is obtained, with the channel information being evaluated with respect to the gain provided by each user receiver in comparison with that obtained by other user receivers. At step 604, determinations are made with respect to interference penalties imposed by receivers on one another. At step 606, user categories are determined based on one or more of service category entitlements and efficiency. At step 608, one or more metrics are computed for scheduling and resource allocation, with scheduling and allocation for each user being based on both gain for the user and overall gain. At step 610, resources are allocated and scheduling is performed based on or more metrics.

Figure 7:
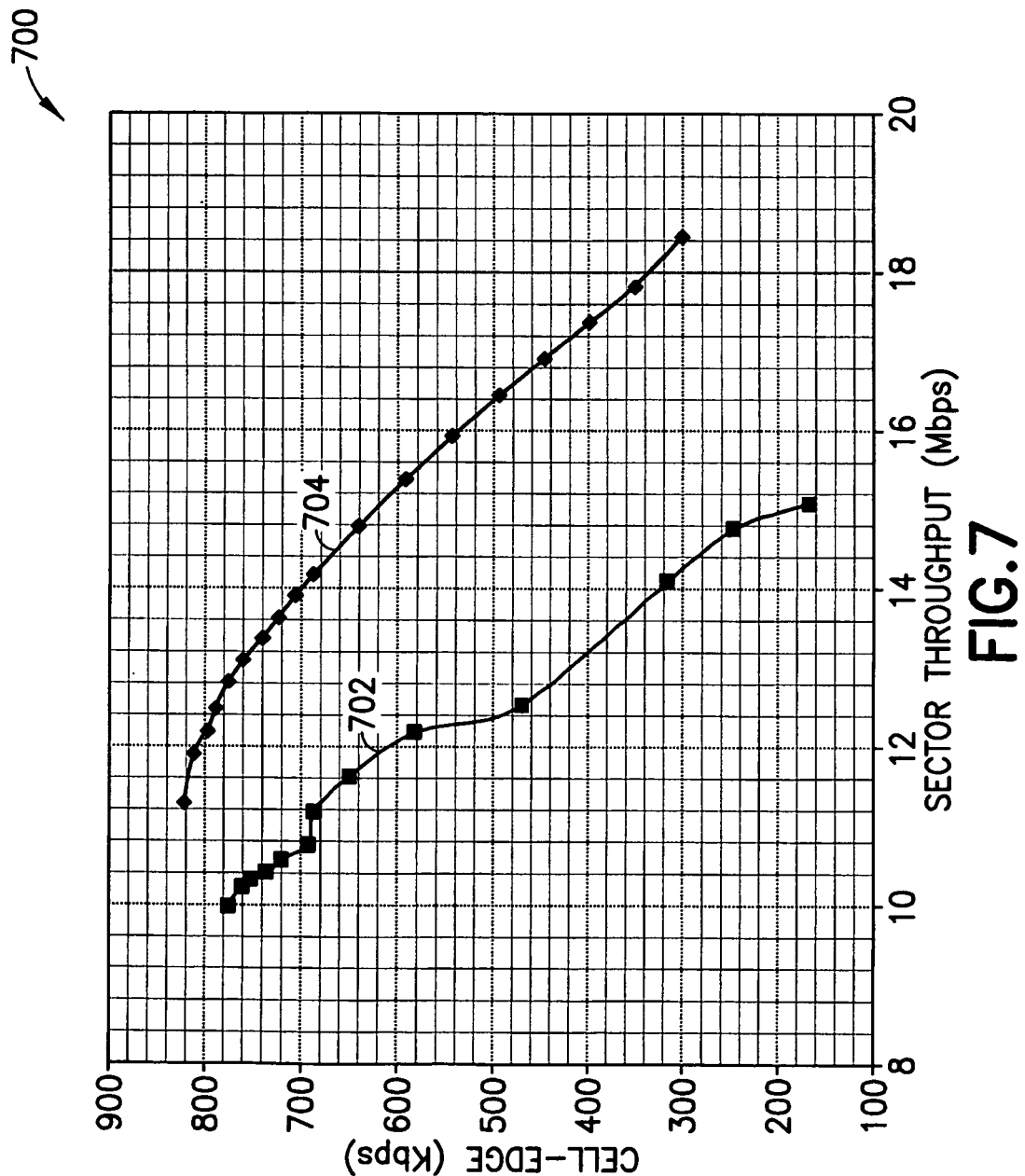

FIG. 7 illustrates a graph 700 showing the improvement provided by one embodiment of the present invention, ranking users according to the metric $m_i$ whose calculation is shown above, as compared to prior art mechanisms for a 3GPP macro case 1 scenario. The graph 700 plots cell edge throughput against sector throughput, and the results achieved by prior art mechanisms are shown in the curve 702, plotting cell edge throughput against sector throughput, while the results achieved by an embodiment of the present invention are shown in the curve 704, showing a significant improvement in both cell edge and sector throughput.

FIG. 8 illustrates a graph 800 showing the improvement provided by one embodiment of the present invention, using the scheduling and allocation of resource blocks using the metric $m_{i,j}$ whose calculation is shown above, as compared to prior art mechanisms for a 3GPP macro case 3 scenario. The graph 800 plots cell edge throughput against sector throughput, and the results achieved by prior art mechanisms are shown in the curve 802, plotting cell edge throughput against sector throughput, while the results achieved by an embodiment of the present invention are shown in the curve 804, showing a significant improvement in both cell edge and sector throughput.

Various modifications and adaptations to the foregoing exemplary embodiments of this invention may become apparent to those skilled in the relevant arts in view of the foregoing description. While various exemplary embodiments have been described above it should be appreciated that the practice of the invention is not limited to the exemplary embodiments shown and discussed here.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

In addition, the various names used for the various parameters, such as $g_i$, $g'_i$, $m_{i,j}$, C, $nu_i$, v, and the like, are not intending to be limited in any respect, as these parameters may be identified by any suitable names. Further, the formulas and expressions that use these various parameters may differ from those expressly disclosed herein.

We claim:
1. A method comprising:
computing relative uplink channel gain of a user equipment to its serving and neighboring cell base stations, wherein computing the relative uplink channel gain comprises taking into account channel gain to the user equipment's serving and neighboring cell base stations and wherein the relative uplink channel gain information is calculated using an uplink sounding reference signal received from the user equipment by the user equipment's serving base station;
computing one or more parameters for scheduling and resource allocation among the user equipment and additional user equipments, wherein the one or more parameters are calculated so as to take into account the relative uplink channel gain of the user equipment and a weighting associated with the user equipment;
wherein at least one of the one or more parameters is calculated so as to maximize overall uplink throughput among all of a plurality of user equipments while providing at least a guaranteed minimum throughput to all users capable of transmitting the guaranteed minimum throughput;
wherein at least one of the one or more parameters takes into account the throughput provided to a user equipment by allocation of a resource block against average throughput provided to the user equipment;
wherein computing the one or more parameters is based at least in part on an analysis of benefit to the user equip- ment of allocation of a resource in light of an interference penalty imposed by the allocation on neighboring cell base stations; and wherein resource blocks are allocated to user equipments in contiguous groups with the size of a contiguous group assigned to a user equipment being computed based at least in part on a target number of resource blocks computed for the user equipment.

2. The method of claim 1, further comprising performing one or more of scheduling and resource allocation among the user equipment and the additional user equipments based at least upon the computed one or more parameters.

3. The method of claim 1, wherein at least one of the one or more parameters comprises transmit power for the user equipment.

4. The method of claim 1, wherein at least one of the one or more parameters comprises a target signal to interference plus noise ratio for uplink transmission.

5. The method of claim 1, wherein at least one of the one or more parameters takes into account increase in utility provided to user equipments by allocation of resource blocks to the user equipments.

6. The method of claim 5, wherein the taking into account increase in utility provided to the user equipments evaluates the throughput provided by a resource block to one user equipment against the throughput provided by the resource block to a different user equipment.

7. The method of claim 1, wherein at least one of the one or more parameters computes a target number of resource blocks.

8. The method of claim 7, wherein the at least one of the one or more parameters computes a target number of resource blocks for each of a plurality of categories of user equipments, wherein the user equipments are assigned to categories by transmission efficiency.

9. The method of claim 1, wherein at least one of the parameters comprises a user ranking metric computed for relative ranking of users.

10. The method of claim 9, wherein the user ranking metric comprises information relating to target numbers of resource blocks and categories of user equipments, wherein user equipments are assigned to categories according to transmission efficiency.

11. The method of claim 1, wherein the relative uplink channel gain of the user equipment to its serving and neighboring cell base stations is calculated from the channel quality indication information received from the user equipment relating to the monitoring by the user equipment of transmissions from the user equipment's serving base station and to the monitoring by the user equipment of transmissions from the base stations serving neighbor cells of the user equipment.

12. An apparatus comprising:
a processor;
memory storing a program of instructions, wherein the program of instructions are configured, with the processor and the memory, to cause the apparatus to perform at least the functions of:
computing relative uplink channel gain of a user equipment to its serving and neighboring cell base stations;
wherein computing the relative uplink channel gain comprises taking into account channel gain of the user equipment to its serving and neighboring cell base stations and wherein the relative uplink channel gain information is calculated using an uplink sounding reference signal received from the user equipment by the user equipment's serving base station;
computing one or more parameters for scheduling and resource allocation among the user equipment and the other user equipments, wherein the one or more parameters are calculated so as to take into account the computed relative uplink channel gain of the user equipment and a weight value assigned to the user equipment, wherein at least one of the one or more parameters is calculated so as to maximize overall uplink throughput among all of a plurality of user equipments while providing at least a guaranteed minimum throughput to all users capable of transmitting the guaranteed minimum throughput;
wherein computation of at least one of the one or more parameters takes into account the throughput provided to a user equipment by allocation of a resource block against average throughput provided to the user equipment;
wherein computing the one or more parameters is based at least in part on an analysis of benefit to the user equipment of allocation of a resource in light of an interference penalty imposed by the allocation on neighboring cell base stations; and
wherein resource blocks are allocated to user equipments in contiguous groups with the size of a contiguous group assigned to a user equipment being computed based at least in part on a target number of resource blocks computed for the user equipment.

13. The apparatus of claim 12, wherein the functions further comprise performing one or more of scheduling and resource allocation among the user equipment and the additional user equipments based at least upon the computed one or more parameters.

14. The apparatus of claim 12, wherein at least one of the one or more parameters comprises transmit power for the user equipment.

* * * * *